(12) United States Patent
Saudemont et al.

(10) Patent No.: US 6,239,059 B1
(45) Date of Patent: May 29, 2001

(54) ACTIVATOR SOLID SUPPORT FOR METALLOCENE CATALYSTS IN THE POLYMERIZATION OF OLEFINS, A PROCESS FOR PREPARING SUCH A SUPPORT, AND THE CORRESPONDING CATALYTIC SYSTEM AND POLYMERIZATION PROCESS

(75) Inventors: Thierry Saudemont, Salies de Bearn; Roger Spitz, Lyons; Jean-Pierre Broyer, Bron; Jean Malinge, Loubieng; Nathalie Verdel, Gaillac, all of (FR)

(73) Assignee: Elf Atochem, S.A., Puteaux (FR)

( * ) Notice: Subject to any disclaimer, the term of this patent is extended or adjusted under 35 U.S.C. 154(b) by 0 days.

(21) Appl. No.: 09/165,345

(22) Filed: Oct. 2, 1998

(30) Foreign Application Priority Data

Oct. 2, 1997 (FR) .................................................. 97 12270

(51) Int. Cl.$^7$ .................................................... B01J 31/16

(52) U.S. Cl. ........................... 502/120; 502/152; 526/160; 526/943

(58) Field of Search .................................... 502/120, 152; 526/943, 160

(56) References Cited

U.S. PATENT DOCUMENTS

| | | | |
|---|---|---|---|
| 4,100,337 | * 7/1978 | Noshay et al. | 526/130 |
| 5,037,911 | 8/1991 | McDaniel et al. | |
| 5,064,796 | * 11/1991 | Speca | 502/107 |
| 5,401,820 | 3/1995 | McDaniel et al. | |
| 5,527,867 | 6/1996 | Bergmeister | |
| 5,543,376 | 8/1996 | Bergmeister | |

FOREIGN PATENT DOCUMENTS

| | | |
|---|---|---|
| 0 166 157 | 1/1986 | (EP). |
| 0 276 863 | 8/1988 | (EP). |
| 0 427 697 A3 | 5/1991 | (EP). |
| 0 594 914 A1 | 5/1994 | (EP). |
| 0 728 773 A1 | 8/1996 | (EP). |
| WO 91/09882 | 7/1991 | (WO). |
| WO 96/23005 | 8/1996 | (WO). |

OTHER PUBLICATIONS

French Search Report dated Jun. 12, 1998.
J. Ewen, M. Elder, R. Jones, L. Haspeslagh, J. Atwood, S. Bott and K. Robinson, Makromol. Chem. Macromol. Symp. 48/49, 253 (1991) (to be provided).
McDaniel, J. Catal., 67, 71 (1981) (to be provided).
Thesis of Veronique Gachard–Pasquet, Universite Claude Bernard, Lyon 1, France, 1985, pp. 221–224. (to be provided).
M.Bochmann and S. Lancaster: Organometallics, 12, 633 (1993) (to be provided).

John A. Ewen, et al., "Metallocene/Polyropylene Structural Relationships: Implications on Polymerization and Stereochemical Control Mechanisms," *Makromol. Chem. Macromol. Symp.* 48/49, 1991, pp. 253–295.
M.P. McDaniel, "The State of Cr(VI) on the Cr/Silica Polymerization Catalyst," *Journal of Catalysis* 67, 1981, pp. 71–76.
Thesis of Veronique Gachard–Pasquet, "Synthese Controlee de Copolymeres Ethylene–Butene Par Catalyseziegler–Natta Bisupportee," presented at the Université Claude Bernard, Lyon 1, France, Oct. 17, 1985, page nos. not listed.
Manfred Bochmann, et al., "Base–Free Cationic Zirconium Benzyl Complexes as Highly Active Polymerization Catalysts," *Organometallics*, 12, 1993, pp. 633–640.
Scott Collins, et al., "Polymerization of Propylene Using Supported, Chiral, ansa–Metallocene Catalyst: Production of Polypropylene with Narrow Molecular Weight Distributions[1a]," *Macromolecules*, 25, 1992, pp. 1780–1785.
Manabu Kaminaka, et al., "Polymerization of propene with the catalyst systems composed of $Al_2O_3$-or $MgCl_2$-supported $Et[IndH_4]_2ZrCl_2$ and $AIR_3$ ($R=Ch_3$, $C_2H_5$),"*Makromol. Chem., Rapid Commun.* 12, 1991, pp. 367–372.
Gregory G. Hlatky, et al., "Olefin Polymerization by Supported Ionic Metallocene Catalysts," *A.C.S. Pol. Preprints*, 37, Mar. 1996, pp. 249–250.

(List continued on next page.)

Primary Examiner—David W. Wu
Assistant Examiner—Caixia Lu
(74) Attorney, Agent, or Firm—Smith, Gambrell & Russell, LLP

(57) ABSTRACT

Activator solid support for metallocenes as catalysts in the polymerization of olefins, characterized in that it consists of a group of support particles for a solid catalytic component, which are formed from at least one porous mineral oxide, the said particles having been modified in order to carry, on the surface, aluminium and/or magnesium Lewis-acid sites of formula:

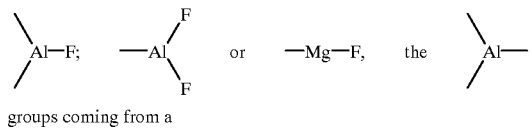

groups coming from a functionalization agent having reacted with —OH radicals carried by the base particles of the support, the functionalization reaction having been followed by a fluorination reaction.

Also disclosed is a catalytic system including a metallocene catalyst, which has optionally been subjected to a prealkylation treatment; a cocatalyst; and an activator solid support for metallocene, as defined above.

46 Claims, No Drawings

OTHER PUBLICATIONS

Tobin J. Marks, "Surface–Bound Metal Hydrocarbyls. Organometallic Connections between Heterogeneous and Homogeneous Catalysis," *Accounts of Chemical Research*, vol. 25, No. 2, Feb. 1992, pp. 57–65.

Kazuo Soga, et al., "Polymerization of Propene with Zirconocene–containing Supported Catalysts Activated by Common Trialkylaluminiums," *Makromol Chem.* 194, 1993, pp. 1745–1755.

David Hedden, et al., [$(CH_3)_5C_5]_2$ Th$(CH_3)_2$ Surface Chemistry and Catalysis. Direct NMR Spectroscopic Observation of Surface Alkylation and Ethylene Insertion/Polymerization on MgC12, *J. Am. Chem. Soc.* 110, 1988, pp. 1647–1649.

John A. Ewen, et al., "Synthesis and Models for Sterospecific Metallocenes," *Makromol. Chem., Macromol. Symp.*, 66, 1993, pp. 179–190.

Kazo Soga, et al., "A Mettallocene Catalyst System for Olefin Polymerization Using a Heteropolyacid as the Counter–Anion," Macromol. Rapid. Commun., 16, 1995, pp. 793–798.

Son–Ki Ihm, et al., "Catalyst Design for Tailor–made Polyolefins: Molecular Weight Distribution Control with Supported Metallocene Catalysts," K. Soga, et al., Eds. Koudansha–Elsevier, Tokyo, 1994, pp. 257–269.

* cited by examiner

ACTIVATOR SOLID SUPPORT FOR METALLOCENE CATALYSTS IN THE POLYMERIZATION OF OLEFINS, A PROCESS FOR PREPARING SUCH A SUPPORT, AND THE CORRESPONDING CATALYTIC SYSTEM AND POLYMERIZATION PROCESS

FIELD OF THE INVENTION

The present invention relates to an activator solid support for metallocene catalysts used for the polymerization of olefins, to a process for preparing such a support, to the corresponding catalytic system and to the suspension or gas-phase polymerization of olefins using such a catalytic system.

BACKGROUND OF THE INVENTION

It is well known to (co)polymerize ethylene and α-olefin in the presence of a metallocene/aluminoxane catalyst system. The first very active catalytic system of this type that was discovered is that based on zirconocene: $Cp_2ZrCl_2$/aluminoxane. Metallocene/aluminoxane catalyst systems are soluble in the polymerization medium. The extension of research in this field has led to the discovery of other metallocene catalysts, such as bridged metallocenes which are capable, in the case of the copolymerization of ethylene with α-olefins, of leading to better uniformity in the distribution of the comonomers in the molecular chains.

However, aluminoxanes, in particular methylaluminoxane which is the most commonly used, have the drawbacks of being expensive and unstable substances which are partly responsible for the poor morphology of the polymers, a situation which causes fouling of the reactors and which makes the conveying process very complicated.

DESCRIPTION OF THE INVENTION

Applicant has sought to solve this problem for the purpose of providing a metallocene-based catalytic system, which is active for the polymerization of olefins and does not use aluminoxane, or uses less aluminoxane than in the past.

It is now accepted that a metallocene complex has a cationic nature in its active form. This has been confirmed by several spectroscopic methods and by the equivalence of the properties of two polymers, one produced by the metallocene/aluminoxane system and the other produced by metallocene/stable cationic salt systems. The role of the aluminoxane is assumed to be the alkylation of the metallocene, the activation of the methylated species by the formation of a cationic complex and the stabilization of this active species. Many non-coordinating counteranions have been proposed for replacing the aluminoxane in its activator role [J. Ewen, M. Elder, R. Jones, L. Haspeslagh, J. Atwood, S. Bott and K. Robinson, Makromol. Chem. Macromol. Symp. 48/49, 253 (1991) and M. Bochmann and S. Lancaster: Organometallics, 12, 633 (1993)].

Applicant has discovered that the counteranion of the active cationic complex could consist of a solid support, advantageously having a defined and controlled structure comparable to that of the supports employed in conventional Ziegler-Natta catalysis in order to allow physical development of the polymerization, the said support being functionalized in order to create acid sites which activate the metallocene without complexing it.

The solid support according to the invention, as defined below, constitutes an activator support which has made it possible to reach levels of activity, in the polymerization of olefins, at least equal to, but often greater than, the activity displayed by a purely homogeneous system.

The subject of the present invention is therefore firstly an activator solid support for metallocenes as catalysts in the polymerization of olefins, characterized in that it consists of a group of support particles for a solid catalytic component, which are formed from at least one porous mineral oxide, the said particles having been modified in order to carry, on the surface, aluminium and/or magnesium Lewis-acid sites of formula:

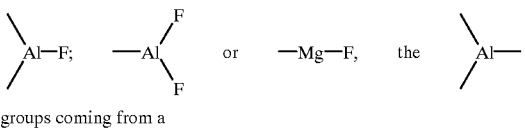

groups coming from a functionalization agent having reacted with —OH radicals carried by the base particles of the support, the functionalization reaction having been followed by a fluorination reaction.

The direct use of aluminium and/or magnesium fluorides presents difficulties which are barely surmountable in terms of forming a support having suitable particle-size and porosity properties.

The porous mineral oxides are advantageously chosen from silica, alumina and mixtures thereof.

The porous mineral oxide particles preferably have at least one of the following characteristics:
- they include pores having a diameter ranging from 7.5 to 30 nm (75 to 300 Å);
- they have a porosity ranging from 1 to 4 $cm^3/g$;
- they have a specific surface area ranging from 100 to 600 $m^2/g$; and
- they have an average diameter ranging from 1 to 10 $\mu m$.

Before it is modified, the support has —OH radicals on its surface, in particular from 0.25 to 10, and even more preferably from 0.5 to 4 —OH radicals, per $nm^2$. After it has been modified, the said support has as many at least partially fluorinated aluminium and/or magnesium Lewis-acid sites per $nm^2$.

The support may be of various kinds. Depending on its nature, its state of hydration and its ability to retain water, it is possible to make it undergo dehydration treatments of greater or lesser intensity depending on the desired surface content of —OH radicals.

Those skilled in the art may determine, by routine tests, the dehydration treatment that should be applied to the support that they have chosen, depending on the desired surface content of —OH radicals.

For example, if the support is made of silica, which is in accordance with a preferred embodiment of the invention, the silica may be heated between 100 and 1000° C. and preferably between 140 and 800° C., with purging by an inert gas such an nitrogen or argon, at atmospheric pressure or under a vacuum, for example of an absolute pressure of $1 \times 10^{-2}$ millibars, for at least 60 minutes, for example. For this heat treatment, the silica may be mixed, for example, with $NH_4Cl$ so as to accelerate the dehydration.

If this heat treatment is between 100 and 450° C., it is conceivable to follow it with a silanization treatment. This kind of treatment results in a species derived from silicon being grafted on the surface of the support in order to make this surface more hydrophobic. This silane may, for example, be an alkoxytrialkylsilane, such as methoxytrimethylsilane, or a trialkylchlorosilane, such as trimethylchlorosilalne or triethylchlorosilane.

This silane is generally applied to the support by forming a suspension of this support in an organic silane solution. This silane may, for example, have a concentration of between 0.1 and 10 mol per mole of OH radicals on the support. The solvent for this solution may be chosen from linear or branched aliphatic hydrocarbons, such as hexane or heptane, alicyclic hydrocarbons, optionally substituted, such as cyclohexane, and aromatic hydrocarbons, such as toluene, benzene or xylene. The treatment of the support by the silane solution is generally carried out between 50° C. and 150° C., for 1 to 48 hours, and with stirring.

After silanization, the solvent is removed, for example, by siphoning or filtration, the support then being washed, preferably thoroughly, for example using 0.3 l of solvent per gram of support.

The surface —OH radical content of the support may be assayed using known techniques such as, for example, by reacting an organomagnesium compound such as $CH_3MgI$ with the support and by measuring the amount of methane given off [McDaniel, J. Catal., 67, 71 (1981)]; by reacting triethylaluminium with the support and by measuring the amount of ethane given off [Thesis of Véronique Gachard-Pasquet, Université Claude Bernard, Lyon 1, France, 1985, pages 221–224].

According to the present invention, the said at least partially fluorinated aluminium and/or magnesium Lewis-acid sites are formed by the reaction of —OH radicals carried by the support base particles with at least one functionalization agent chosen from:

compounds of formula (I):

$$Al(R^1)_3 \qquad (I)$$

in which the $R^1$ groups, which are identical or different, each represent a $C_1$–$C_{20}$ alkyl group;

compounds of formula (II):

$$Mg(R^2)_2 \qquad (II)$$

in which the $R^2$ groups, which are identical or different, each represent a $C_1$–$C_{12}$ alkyl group; and compounds of formula (III):

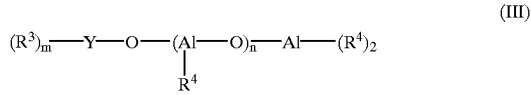

(III)

in which
the $R^3$ groups, which are identical or different, each represent a $C_1$–$C_{12}$ alkyl group or a $C_1$–$C_{12}$ alkoxy group;
the $R^4$ groups, which are identical or different, each represent a $C_1$–$C_{12}$ alkyl group or a $C_1$–$C_{12}$ alkoxy group;
Y represents Al or Si, m having a value of 2 if Y=Al and 3 if Y=Si; and
n has a value of 0 or is an integer from 1 to 40, n preferably having a value of 0 or being an integer from 1 to 20;
compounds of formula (IV):

(IV)

in which: the $R^5$ groups each represent a $C_1$–$C_8$ alkyl group; and
p is an integer from 3 to 20, the said functionalization reaction having been followed by a fluorination reaction.

By way of examples of compounds (I), mention may be made of those in which the $R^1$ groups represent methyl, ethyl, butyl and hexyl, it being possible for the aluminium to carry 1, 2 or 3 different groups; a preferred compound (I) is triethylaluminium.

By way of examples of compounds (II), mention may be made of those in which $R^2$ represents methyl, ethyl and butyl; a preferred compound (II) is (n-butyl) (sec-butyl) magnesium.

By way of examples of compounds (III), mention may be made of dibutoxyaluminoxytriethoxysilane $(C_2H_5O)_3Si$—O—Al—$(OC_4H_9)_2$, tetraisobutyldialuminoxane $(iBU)_2Al$—O—$Al(iBu)^2$ and linear alkylaluminoxane oligomers, in particular those in which $R^3$ and $R^4$ are methyl groups.

Compounds (IV) are cyclic alkylaluminoxane oligomers; in particular, mention may be made of those in which $R^5$ is a methyl group.

The present invention also relates to a fluorinated functionalized support, as described above, in the state in which it is pre-impregnated with a metallocene catalyst, the said metallocene catalyst having been subjected, if required, to a prealkylation treatment carried out before or after the said support has been pre-impregnated.

The present invention also relates to a process for preparing an activator solid support for metallocenes as catalysts in the polymerization of olefins, characterized in that a group of support particles for a solid catalytic component, which are formed from at least one porous mineral oxide and carry, on the surface, —OH radicals, undergoes functionalization by using a functionalization agent capable of grafting aluminium and/or magnesium Lewis-acid sites on the said particles; the said support particles thus grafted are then subjected to a fluorination treatment.

In order to implement this process, it is possible to use the support particles such as those described above and the functionalization agents such as those described above.

In a preferred method of implementing this process, the functionalization is carried out by treating a suspension of the said particles in a solvent medium with the said functionalization agent at a temperature ranging from −150° C. to +150° C. for a period of time ranging from 1 minute to 12 hours, and then by recovering the grafted particles after washing. The solvent is especially chosen from aliphatic, alicyclic and aromatic hydrocarbons, and more preferred temperature and time conditions are from 30 to 100° C. and from 1 to 3 hours. In particular, from 0.5 to 20 mmol of functionalization agent per g of particles are used.

After functionalization, a heat treatment in an inert gas (such as argon or nitrogen) may optionally be carried out, preferably in a bed fluidized by the said inert gas, the said treatment being intended to remove the alkoxy groups present on the surface, which groups could come from the functionalization agent carrying $R^3$ and/or $R^4$ alkoxy radicals. This heat treatment, or pyrolysis, is advantageously carried out at approximately 200–600° C. for approximately 1–10 hours. If the treatment were not carried out, the alkoxy groups could be the cause of water forming by reaction with oxygen during an, oxidation treatment which may be intended before the final fluorination. This is because it is desirable to remove any trace of water since water is likely to adversely affect or poison the solid support.

The oxidation treatment indicated above may advantageously consist of a heat treatment of the functionalized support particles, in a bed fluidized by oxygen, for example at 200–600° C. for 1–10 hours. This treatment makes it possible to increase the acidity of the surface of the support and, consequently, the performance of the catalytic system.

The radicals $R^1$, $R^2$, $R^3$, $R^4$ and $R^5$ are at least partially replaced by F during the final fluorination step. The fluorination treatment may be carried out by bringing the functionalized support particles into contact with gaseous hydrofluoric acid, if necessary after heat treatment in an inert gas and/or after oxidation, this contacting step being carried out for a period of time ranging from 1 minute to 24 hours, at a temperature ranging from 20 to 800° C.; however, the hydrofluoric acid may advantageously be replaced by $(NH_4)SiF_6$, in which case the functionalized support particles are mixed with powdered $(NH_4)_2SiF_6$, if necessary after heat treatment in an inert gas and/or after oxidation; the actual fluorination treatment with $(NH_4)_2SiF_6$ consists especially in gently fluidizing the aforementioned mixture of support particles and $(NH_4)_2SiF_6$ with an inert gas, such as argon or nitrogen, and in carrying out a heat treatment at a temperature of approximately 300 to 500° C. for approximately 1 to 10 hours. In general, especially from 1 to 5% by weight, in particular 3 to 5% by weight, of fluorine with respect to the said support particles are used for the fluorination (above the value of 5% by weight, the support undergoes degradation).

The present invention also relates to a catalytic system for the polymerization of olefins, comprising:

(a) a metallocene catalyst, which has, if required, been subjected to a prealkylation treatment;

(b) a cocatalyst; and (c) an activator solid support for metallocene, as defined above or prepared by the process as defined above, it being possible for the cocatalyst (b) to be absent if the metallocene catalyst (a) has been prealkylated, it being possible for the support (c) to have been impregnated with the metallocene catalyst (a), which catalyst has, if required, been subjected to a prealkylation treatment carried out either before or after the said support has been pre-impregnated.

The metallocene catalyst (a) generally consists of a compound of formula (V):

$$ML_x \qquad (V)$$

in which:

M represents a transition metal belonging to Group 4b of the Periodic Table of Elements according to the Handbook of Chemistry and Physics, 61st edition;

L represents a ligand coordinated to the transition metal, at least one ligand L being a group having a cycloalkadienyl-type backbone; and x is equal to the valency of the transition metal, the ligands L, the number of which is equal to the valency of the transition metal M, being identical or different., In particular, M is Ti, Zr or Hf.

The expression "group having a cycloalkadienyl-type backbone" should be understood to mean the cycloalkadienyl group itself or a substituted cycloalkadienyl group.

Preferably, a cycloalkadienyl group is a cyclopentadienyl group.

When the compound of formula $ML_x$ contains at least two groups having a cycloalkadienyl-type backbone, at least two of these groups may be linked together by a divalent radical. Each divalent radical may be an alkylene radical, such as the methylene radical ($—CR_2—$), the ethylene radical ($—CH_2CH_2—$) or the trimethylene radical ($—CH_2CH_2CH_2—$), it being possible for this alkylene radical also to be substituted, for example by at least one hydrocarbon group, such an the isopropylidene radical; the divalent radical may also be a silylene ($—SiH_2$) group, optionally substituted, for example by at least one hydrocarbon group, as is the case with dialkylsilylene (dimethylailylene), diarylsilylene (diphenylsilylene) or alkylarylsilylene (methylphenylsilylene) radicals.

When a cycloalkadienyl group is substituted, the substituents are especially chosen from $C_1$–$C_{20}$ alkyl, $C_2$–$C^{20}$ alkenyl, aryl and aralkyl groups. Two substituents which are in adjacent positions on the same cycloalkadienyl ring may be linked together, forming an aromatic or non-aromatic ring condensed on the said cycloalkadienyl ring. If the latter is a cyclopentadienyl ring, the resulting condensed cycle may be an indenyl, tetrahydroindenyl, fluarenyl or octahydrofluorenyl ring.

Moreover, at least one ligand L may be chosen from:

groups of formula:

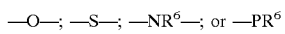
$—O—$; $—S—$; $—NR^6—$; or $—PR^6$ (where $R^6$ represents hydrogen or a group chosen from the silyl, alkyl or aryl groups, the latter two being optionally halogenated), one of the free valencies of which is linked to the transition metal M atom and the other free valency of which is linked to a divalent radical which is itself linked to a ligand L having a cycloalkadienyl backbone; and groups of formula:

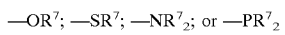
$—OR^7$; $—SR^7$; $—NR^7{}_2$; or $—PR^7{}_2$ ($R^7$ having the same meaning as $R^6$ above), the free valency of which is linked to a divalent radical which is itself linked to a ligand L having a cycloalkadienyl backbone;

examples of divalent radicals having been indicated above in the description of the agents carrying two cycloalkadienyl ligand.

Ligands L differing from those mentioned above may be chosen from:

hydrocarbon groups containing from 1 to 20 carbon atoms, such as linear or branched alkyl groups (such as methyl, ethyl, propyl, isopropyl and butyl); cycloalkyl groups (such as cyclopentyl and cyclohexyl); aryl groups (such as phenyl); alkaryl groups (such as tolyl); and aralkyl groups (such as benzyl);

alkoxy groups, such as methoxy, ethoxy, butoxy and phenoxy; and halogens, such as fluorine, chlorine, bromine and iodine.

By way of examples, the metallocene catalyst may be chosen from the following compounds:

bis(cyclopentadienyl)dichlorozirconium ($Cp_2ZrCl^2$);

bis(indenyl)dichlorozirconium ($Ind_2ZrCl_2$);

bis(n-butylcyclopentadienyl)dichlorozirconium [(nBuCp)$_2ZrCl^2$];

ethylenebis(4,5,6,7-tetrahydro-1-indenyl) dichlorozirconium [Et(THInd)$_{2ZrCl2}$];

ethylenebis(indenyl)dichlorozirconium [Et(Ind)$_2ZrCl_2$];

isopropylidene(cyclopentadienyl, fluorenyl)-dichlorozirconium [iPr(Cp)(Flu)ZrCl$_2$];

isopropylidenebis(tert-butylcyclopentadienyl)-dichlorozirconium [iPr(tBuCp)$_2$ZrCl$_2$];

dimethylsilyl(3-tert-butylcyclopentadienyl, fluorenyl) dichlorozirconium;

dimethylsilylbisindenyldichlorozirconium [Me$_2$Si(Ind)$_2$ZrCl$_2$];

bis(cyclopentadienyl)dimethylzirconium;

bis(indenyl)dimethylzirconium, (Ind$_2$ZrMe$^2$);

ethylenebis(4,5,6,7-tetrahydro-1-indenyl) dimethylzirconium;

ethylenebis(indanyl)dimethylzirconium;

isopropylidene(cyclopentadienyl, fluorenyl) dimethylzirconium;

dimethylsilyl(3-tert-butylcyclopentadienyl, fluorenyl) dimethylzirconium;

bis(cyclopentadienyl)diphenylzirconium;

bis(cyclopentadienyl)dibenzylzirconium;

dimethylailyl(tetramethylcyclopentadienyl, tert-butylamino)dichlorozirconium, the latter compound having the formula $(CH_3)_2Si((CH_3)_4C_5, (CH_3)_3CN)ZrCl_2$;

dimethylsilyl(tetramethylcyclopentadienyl, tert-butylamino)dimethyltitanium, this compound having the formula $(CH_3)_2Si((CH_3)_4C_5, (CH_3)_3CN)Ti(CH_3)_2$;

bis(cyclopentadienyl)dichlorotitanium;

ethylenebis(4,5,6,7-tetrahydro-1-indenyl) dichlorotitanium;

ethylenebis(indenyl)dichlorotitanium;

isopropylidene(cyclopentadienyl, fluorenyl) dichlorotitanium;

dimethylsilyl(3-tert-butylcyclopentadienyl, fluoranyl) dichlorotitanium;

bis(cyclopentadianyl)dimethyltitanium;

ethylenebis(4,5,6,7-tetrahydro-1-indanyl) dimethyltitanium;

ethylenebis(indenyl)dimethyltitanium;

isopropylidene(cyclopentadienyl, fluorenyl) dimethyltitanium;

dimethylsilyl(3-tert-butylcylopentadienyl, fluorenyl) dimethyltitanium;

dimethylsilyl(tetramethylcyclopentadienyl, tert-butylamino)dichlorotitanium, the latter compound having the formula $(CH_3)_2Si((CH_3)_4C_5, (CH_3)_3CN)TiCl_2$.

With regard to the cocatalysts (b), they are especially chosen from:

(b1) alkylaluminium of formula (Ia):

$$Al(R^8)_3 \qquad (Ia)$$

in which the $R^8$ groups, which are identical or different, represent a substituted or unsubstituted alkyl, containing from 1 to 12 carbon atoms such as ethyl, isobutyl, n-hexyl and n-octyl; an alkoxy; an aryl; a halogen; hydrogen or oxygen; at least one $R^8$ group-representing an alkyl;

(b2) aluminium sesquihalides;

(b3) compounds of formula (IIIa) consisting of compounds of formula (III) as defined above, in which Y=Al; and (b4) compounds of formula (IV) as defined above.

By way of examples of cocatalyst (b), mention may be made of methylaluminoxane, triisobutylaluminium and triethylaluminium.

As was mentioned above, the metallocene catalyst may be pre-impregnated on the activator support. This pre-impregnation may be carried out as follows:

The activator support is put into suspension, in a solvent chosen from aliphatic, alicyclic or aromatic hydrocarbons, with the metallocene. The operation is carried out between 0 and 140° C. for 1 hour to 10 hours. The proportion of metallocene represents between 0.01 and 20% by mass with respect to the activator support. At the end of the operation, the mixture is decanted in order to remove the supernatant liquid. The support is then washed several times, between 20 and 140° C., with a quantity of solvent of between 50 and 300 ml per gram of support.

Moreover, as already-mentioned above, the metallocene (a) may have been subjected to prealkylation; if the activator support is pre-impregnated with the metallocene (a), this prealkylation may take place either before or after the pre-impregnation.

The prealkylation may be carried out using an alkylizing agent, such as an alkyllithium or an alkylmagnesium, the straight-chain or branched alkyl group having from 1 to 20 carbon atoms, under the following conditions:

The metallocene or the impregnated solid support are placed in a Schlenk tube containing from 10 to 50 ml of a solvent, chosen from aliphatic, alicyclic or aromatic hydrocarbons, per gram of support or per 10 milligrams of metallocene. The temperature of the mixture is taken to between −100 and 0° C. Between 1 and 5 mol of alkylizing agent per mole of metallocene are then introduced. After they have been introduced, the reaction mixture is left so as to come slowly back to room temperature. The complete operation lasts between 1 and 10 hours.

In the catalytic system according to the invention, the molar ratio of Al of the cocatalyst (b1) or (b2) to the transition metal of the metallocene is especially from 1 to 10,000, in particular from 1 to 2000; and the molar ratio of Al of the cocatalyst (b3) or (b4) to the transition metal of the metallocene (a) is especially from 1 to 10,000, in particular from 10 to 200. Moreover, the activator solid support is used especially in an amount ranging from 0.01 to 2000 mg, in particular from 0.01 to 200 mg, per μmole of metallocene catalyst.

The present invention also relates to a process for homopolymerizing or copolymerizing olefins, in suspension or in the gas phase, in the presence of a catalytic system as defined above.

The olefins which can be used for the polymerization (homopolymerization and copolymerization) are, for example, the olefins containing from two to twenty carbon atoms and, in particular α-olefine of this group. Mention may be made of ethylene, propylene, 1-butene, 4-methyl-1-pentene, 1-octene, 1-hexene, 3-methyl-1-pentene, 3-methyl-1-butene, 1-decene and 1-tetradecene, or mixtures thereof as the olefin. In particular, the olefin is ethylene.

If the polymerization process is carried out in suspension, it may be performed in the following manner; a suspension in an inert medium, such as an aliphatic hydrocarbon, of the catalytic system in introduced into, a reactor, the concentration of the metallocene (a) being from 0.5 μmol/l to 10 μmol/l, that of the cocatalyst (b) being from 0.01 to 5 mmol/l, the amount of activator solid support being from 0.5 to 1000 mg/l, and then the olefin or olefins are introduced at a pressure ranging from 1 to 250 bar, the (co)polymerization being carried out at a temperature ranging from −20° C. to 250° C. for a period of time ranging from 5 minutes to 10 hours.

It is possible to use n-heptane, n-hexane, isohexane, isopentane or isobutane as the aliphatic hydrocarbon.

The preferred conditions are as follows:

pressure ranging from 0.5 to 60 bar;

temperature ranging from 10° C. to a temperature slightly below the melting point of the polymer (5° C. below this melting point).

If the polymerization is carried out in the gas phase, it may be performed as follows: the olefin or olefins are injected at a pressure of 1–60 bar, at a temperature ranging from 10 to 110° C., into a reactor having a stirred bed and/or a fluidized bed of the catalytic system. In this case, the metallocene catalyst has been impregnated into the activator support and the cocatalyst is introduced by injection into the reactor or by impregnation of a solid charge injected into the reactor.

The aforementioned polymerization processes may involve a chain-transfer agent so as to control the melt flow index of the polymer to be produced. Hydrogen may be used as the chain-transfer agent, this being introduced in an amount which can range up to 90% and preferably lies between 0.01 and 60% in terms of moles of the olefin/hydrogen combination injected into the reactor.

If it is desired to have excellent morphological control of the polymer particles, it is recommended to carry out a suspension, or, preferably gas-phase prepolymerization step on the catalytic system of the invention and then to introduce the prepolymer particles thus obtained into the suspension or gas-phase (co)polymerization process proper. The prepolymerization is carried out to a degree tailored to the polymerization process in which the prepolymer will subsequently be used.

The following examples illustrate the present invention without, however, limiting its scope. In these examples, the following abbreviations have been used for the (co)polymers prepared:

$\overline{M}_w$=weight-average molecular mass $\overline{M}_n$=number-average molecular mass, these masses being determined by SEC $\overline{M}_w/\overline{M}_n$=polydispersivity % mm=percentage of meso diads, determined by NMR.

The activator solid supports for the metallocene catalysts prepared have been denoted according to the following preparation steps: $SiO_2$/functionalization agent/$O_2$ (oxygenation)/F (fluorination).

The activities and productivities are regarded as zero when they are less than $10^2$ g/mol.h and g/mol, respectively.

All the containers and reactors used were purged with argon and, unless otherwise specified, the syntheses were carried out in an argon atmosphere.

With regard to the (co)polymerization reactions, unless otherwise indicated, the concentrations are with respect to the quantity of solvent used for the (co)polymerization.

Agents used for functionalizing the silanol groups of the silica:

di(sec-butoxy)aluminoxytriethoxysilane, $(C_2H_5O)_3—Si—O—Al—(OC_4H_9)_2$ $MgBu_2$=(n-butyl)(sec-butyl) magnesium TEA=triethylaluminium.

Metallocene catalysts used:

$Cp_2ZrCl_2$, $Ind_2ZrCl_2$, $Ind_2ZrMe_2$, $Me_2Si(Ind)_2ZrCl_2$, $Et(Ind)_2ZrCl_2$: defined above.

Cocatalysts used:

MAO=methylaluminoxane

TiBA=triisobutylaluminium

TEA=triethylaluminium.

In the expression for the activity (this is the maximum activity, unless otherwise mentioned) in g of (co)polymer/$g_{cat}$.h and for the productivity in g of (co)polymer/$g_{cat}$, $g_{cat}$ means the mass of activator solid+mass of metallocene.

I—POLYMERIZATION OF ETHYLENE

Pressure: 4 bar

Temperature: 80° C.

Suspension medium: 300 cm$^3$ of heptane.

EXAMPLES

Example 1

(a) Preparation of the activator solid support $SiO_2$/dibutoxyaluminoxytriethoxysilane/$O_2$/F Silica having a specific surface area of 300 m$^2$/g, sold under the name "GRACE 332" by Grace, is treated in dynamic vacuum according to the following temperature programme:

from 20° C. to 100° C. in 30 minutes;

from 100° C. to 130° C. in 30 minutes;

from 130° C. to 450° C. in 1 hour 30 minutes; and a 450° C. hold for 2 hours.

This treatment gives a silica which contains 1 mmol of OH/g. 1 gram of the heat-treated silica is put into suspension in 20 cm$^3$ of heptane. This suspension is treated with 846 mg of dibutoxyaluminoxytriethoxysilane (352.5 g/mol) at 50° C. for 1 hour. At the end of the reaction, 100 cm$^3$ of heptane are added. After stirring for 10 minutes, the suspension is decanted in order to remove the supernatant liquid. The washing operation is repeated 3 times. After the final washing, the stock is dried for 1 hour at 100° C. in dynamic vacuum. This stock is then treated as a bed fluidized by argon according to the temperature programme:

from 20° C. to 130° C. in 1 hour;

from 130° C. to 450° C. in 1 hour;

a 450° C. hold for 1 hour;

from 450° C. to 20° C. in 2 hours.

This step is followed by a heat treatment identical to the previous one, but by fluidizing the stock with oxygen.

62 mg of $(NH_4)_2SiF_6$ (178 g/mol) are then added. This mixture, gently fluidized using a stream of argon, undergoes the following heat treatment:

from 20° C. to 130° C. in 1 hour;

from 130° C. to 450° C. in 1 hour;

a 450° C. hold for 1 hour;

from 450° C. to 20° C. in 2 hours.

Solid support ① is thus obtained.

(b) Polymerization of ethylene

The following are placed in a 1 liter round-bottomed flask: 300 cm$^3$ of heptane, 0.1 cm$^3$ of an MAO solution (1.53 mol/l of aluminium in toluene), 17 mg of solid support compound ① and 0.9 μmol of $Cp_2ZrCl_2$. This suspension is injected into a 500 cm$^3$ reactor. The polymerization temperature is 80° C. and the pressure of the ethylene is maintained at 4 bar for 60 minutes. 6.6 g of polyethylene is recovered, this having:

$\overline{M}_w$=227,000

$\overline{M}_n$=43,330

$\overline{M}_w/\overline{M}_n$=5.2

Example 2

(a) Preparation of the activator solid support $SiO_2$/$MgBu_2$/F

The silica used in this example is identical to that in Example 1 and underwent the same heat treatment. 4.6 g of this silica are put into suspension in 20 cm$^3$ of heptane. This suspension is treated with 13.5 cm$^3$ of a solution of $MgBu_2$ in hexane (1 mole/l) at 50° C. for 1 hour. At the end of the reaction, 100 cm$^3$ of heptane are added. After stirring for 10 minutes, the suspension is decanted in order to remove the supernatant liquid. The washing operation is repeated 3 times. After the final washing, the stock is dried for 1 hour at 100° C. in dynamic vacuum.

Next, 238 mg of $(NH_4)_2SiF_6$ are added. This mixture, gently fluidized with a stream of argon, undergoes the heat treatment defined at the end of point (a) in Example 1.

Solid support ② is thus obtained.

(b) Polymerization of ethylene

This polymerization is carried out as in Example 1(b), except that 16 mg of solid support compound ② are used.

The results are given in Table 1.

Example 3

(a) Preparation of the activator solid support $SiO_2$/TEA/F

The silica used in this example is identical to that in Example 1 and underwent the same heat treatment. 1 g of this silica is put into suspension in 20 cm³ of heptane. This suspension is treated with 0.8 cm³ of TEA (1.5 mol/l in heptane) at 50° C. for 1 hour. At the end of the reaction, 100 cm³ of heptane are added. After stirring for 10 minutes, the suspension is decanted in order to remove the supernatant liquid. The washing operation is repeated 3 times. After the final washing, the stock is dried for 1 hour at 100° C. in dynamic vacuum.

Next, 62 mg of $(NH_4)_2SiF_6$ (178 g/mol) are added. This mixture, gently fluidized by a stream of nitrogen, undergoes the heat treatment defined at the end of point (a) of Example 1.

Solid support ③ is thus obtained.

(b) Polymerization of ethylene

This polymerization is carried out as in Example 1(b), except that 14 mg of solid support compound ③ are used.

The results are also given in Table 1.

Example 4 (Comparative Example)

Polymerization of ethylene in the absence of an activator solid support for a metallocene catalyst This polymerization is carried out as in Example 1, except that a solid support compound is not used. The polyethylene obtained has the following characteristics:

$\overline{M}_w$=214,600

$\overline{M}_n$=30,940

$\overline{M}_w/\overline{M}_n$=6.9

The results are also given in Table 1.

Example 7

Example 5 is repeated except that the TiBA is replaced by 1.0 cm³ of TEA (1.5 mol/l in heptane, i.e. 5 mmol/l).

The results are as follows:

Activity (gPE/mol Zr.h): 0.49×10⁶

Productivity (gPE/mol Zr): 0.36×10⁶

Example 8 (Comparative Example)

An ethylene polymerization reaction is carried out as in Example 7, except that no activator solid support compound for the catalyst is used.

The results are as follows:

Activity (gPE/mol Zr.h): 1100

Productivity (gPE/mol Zr): 880

Example 9

An ethylene homopolymerization reaction is carried out as in Example 5, except that the 0.9 µmol of $Cp_2ZrCl_2$ are replaced by 0.9 µmol of $Ind_2ZrCl_2$.

The results are given in Table 2.

TABLE 1

Polymerization of ethylene
Metallocene catalyst: $Cp_2ZrCl_2$ in an amount of 3 µmol/l
Cocatalyst = MAO in an amount of 0.5 mmol/l

| Example | Activator solid support for the catalyst (mg) | Activity (gPE/ mol Zr · h) | Productivity (gPE/ mol Zr) | Activity (gPE/ $g_{cat}$ · h) | Productivity (gPE/ $g_{cat}$) | Activation* |
|---|---|---|---|---|---|---|
| 1 | Solid support① (17) | 7.31 × 10⁶ | 4.30 × 10⁶ | 433.5 | 255 | 5.0 |
| 2 | Solid support② (16) | 2.19 × 10⁶ | 1.36 × 10⁶ | 147 | 91 | 1.5 |
| 3 | Solid support③ (14) | 2.04 × 10⁶ | 1.61 × 10⁶ | 137 | 108 | 1.4 |
| 4 (comparative) | — | 1.46 × 10⁶ | 0.89 × 10⁶ | — | — | — |

*Activation = ratio between the activity with a solid and the activity without a solid (taking into account the activities with respect to the amount of zirconium).

Example 5

An ethylene polymerization reaction is carried out under the conditions of Example 1(b), except that the MAO is replaced by 0.4 cm³ of TiBA (1.4 mol/l in heptane, i.e. 2 mmol/l) and solid support ① has been used in an amount of 15 mg instead of 17 mg.

The results are as follows:

Activity (gPE/mol Zr.h): 0.90×10⁶

Productivity (gPE/mol Zr): 0.70×10⁶

Example 6 (Comparative Example)

An ethylene polymerization reaction is carried out as in Example 5, except that no activator solid support for the catalyst is used.

The activity and productivity are zero.

Example 10

An ethylene homopolymerization reaction is carried out as in Example 9, except that 0.1 mmol/l of TiBA are used as cocatalyst.

The results are given in Table 2.

Example 11 (Comparative Example)

An ethylene homopolymerization reaction is carried out as in Example 9, except that no activator solid support compound for the catalyst is used.

The results are given in Table 2.

TABLE 2

Polymerization of ethylene
Metallocene catalyst: $Ind_2ZrCl_2$ in an amount of 3 μmol/l
Activator solid support for the catalyst (apart from Example
11) = solid support[4] in an amount of 10 mg

| Example | Cocatalyst (mmol/l) | Activity (gPE/mol Zr · h) | Productivity (gPE/mol Zr) |
|---|---|---|---|
| 9 | TiBA (2) | $1.06 \times 10^6$ | $6.67 \times 10^5$ |
| 10 | TiBA (0.1) | $6.72 \times 10^6$ | $4.08 \times 10^5$ |
| 11 (comparative) | TiBA (2) | $1.89 \times 10^5$ | $1.57 \times 10^5$ |

Example 12

An ethylene homopolymerization reaction is carried out as in Example 5, except that the 0.9 μmol of $Cp_2ZrCl_2$ are replaced by 0.9 μmol of $Ind_2ZrMe_2$.

The results are given in Table 3.

Examples 13 and 14

An ethylene homopolymerization reaction is carried out as in Example 12, except that 0.5 and 0.1 mmol/l of TiBA are used as cocatalyst, respectively.

The results are given in Table 3.

Example 15 (Comparative Example)

An ethylene homopolymerization reaction is carried out as in Example 12, except that no activator solid support compound for the catalyst is used.

The results are given in Table 3.

TABLE 3

Polymerization of ethylene
Metallocene catalyst: $Ind_2ZrMe_2$ in an amount of 3 μmol/l
Activator solid support for the catalyst (apart from
Example 15) = solid support ① in an amount of 7.5 mg

| Example | Cocatalyst (mmol/l) | Activity (gPE/mol Zr · h) | Productivity (gPE/mol Zr) |
|---|---|---|---|
| 12 | TiBA (2) | $2.37 \times 10^6$ | $1.38 \times 10^6$ |
| 13 | TiBA (0.5) | $2.46 \times 10^6$ | $1.40 \times 10^6$ |
| 14 | TiBA (0.1) | $1.32 \times 10^7$ | $7.37 \times 10^6$ |
| 15 (comparative) | TiBA (2) | 0 | 0 |

Example 16

An ethylene homopolymerization reaction is carried out as in Example 5, except that the 0.9 μmol of $Cp_2ZrCl_2$ are replaced by 0.9 μmol of $Me_2Si(Ind)_2ZrCl_2$ and the TiBA cocatalyst is used in an amount of 5 mmol/l.

The results are as follows:
Activity (gPE/mol Zr.h): $2.02 \times 10^6$
Productivity (gPE/mol Zr): $1.88 \times 10^6$.

Example 17 (Comparative Example)

An ethylene homopolymerization reaction is carried out as in Example 16, except that no catalyst activator solid support compound is used.

The activity and productivity are zero.

Example 18

(a) Preparation of the activator solid support: solid support ①

The procedure is carried out as in Example 1(a).

(b) Pre-impregnation of the solid support with $Cp_2ZrCl_2$ 417 mg of solid support ① are then put into suspension in 50 cm³ of toluene with 70 mg of $Cp_2ZrCl_2$ at 70° C. for 15 hours. At the end of the operation, the mixture is decanted in order to remove the supernatant liquid. 4 operations of washing with toluene at 70° C. for 15 minutes are carried out. Each washing operation is interrupted by a settling operation followed by removal of the supernatant liquid. Finally, a drying operation is carried out at 40° C. for 40 minutes.

Solid support ①' is obtained.

(c) Polymerization of ethylene

The following are placed in a 1 liter round-bottomed flask: 300 cm³ of heptane, 0.10 cm³ of MAO (1.53 mol/l of aluminium in toluene) and 10 mg of pre-impregnated solid support ①'. This suspension is injected into a 500 cm³ reactor. The polymerization temperature is 80° C. and the pressure of the ethylene is 4 bar. After 60 minutes, 2.2 g of polyethylene are recovered.

The results obtained are given in Table 4.

Examples 19 and 20

The procedure as in Example 18 is carried out except that the activator solid supports ② and ③, were used to obtain the solid supports ②' and ③', respectively.

In Example 19, 1.19 g of activator solid support ② and 55 mg of $Cp_2ZrCl_2$ were used.

In Example 20, 877 mg of activator solid support ③ and 80 mg of $Cp_2ZrCl_2$ were used.

The results are given in Table 4.

TABLE 4

Polymerization of ethylene
Metallocene catalyst: $Cp_2ZrCl_2$
Cocatalyst: MAO in an amount of 0.5 mmol/l.

| Example | % of Zr of the metallocene catalyst impregnated into the solid support | Mass of catalyst or activator solid support impregnated (mg) | Activity (gPE/ mol Zr · h) | Activity (gPE/ $g_{cat}$ · h) |
|---|---|---|---|---|
| 18 | 0.93 | Solid support①' (10) | $4.71 \times 10^6$ | 480 |
| 19 | 1.05 | Solid support②' (10) | $6.08 \times 10^6$ | 700 |
| 20 | 0.45 | Solid support③' (9) | $1.43 \times 10^7$ | 220 |

Example 21

(a) Preparation of the activator solid support

The procedure is carried out as for solid support ② in Example 2(a).

(b) Prealkylation of the metallocene 80 mg of $Cp_2ZrCl_2$ are dissolved in 20 cm³ of toluene. The temperature of the solution is then lowered to −80° C. 0.35 cm³ of methyllithium (1.6 mol/l in ether) are then added drop by drop. After the addition has been completed, the reaction mixture is left to return slowly to room temperature. After settling, the supernatant liquid is removed.

(c) Pre-impregnation

Solid support ② from step (a) and the supernatant liquid from step (b) are mixed in 30 cm³ of heptane. The rest of the pre-impregnation operation is identical to that in Example 18(b).

(d) Polymerization of ethylene

The ethylene polymerization is carried out as in Example 18(c).

The results obtained are as follows:

% of Zr impregnated into the solid support: 1.60

Cocatalyst: MAO in an amount of 0.5 mmol/l

Activity (gPE/mol Zr.h): $2.85 \times 10^6$

Activity (gPE/$g_{cat}$.h): 500.

Example 22

(a) Preparation of the activator solid support

The procedure is carried out as for solid support ② in Example 2(a).

(b) Pre-impregnation of the metallocene

The procedure is carried out as in Example 18(b).

(c) Prealkylation of the metallocene

The pre-impregnation solid support is put into suspension in 20 cm³ of toluene. The temperature of the suspension is then lowered to −80° C. 0.14 cm³ of methyllithium (1.6 mol/l in ether) are then added drop by drop. After completing the addition, the reaction mixture is left to come back slowly to room temperature. After settling, the supernatant liquid is removed. The solid support is dried at 40° C. for 30 minutes.

(d) Polymerization

The ethylene polymerization is carried out as in Example 18(c).

The results are as follows:

% of Zr impregnated into the solid support: 0.60

Cocatalyst: MAO in an amount of 0.5 mmol/l

Activity (gPE/mol Zr.h): $3.64 \times 10^6$

Activity (gPE/$g_{cat}$.h): 240.

Example 23

The procedure is carried out as in Example 1, except that the TiBA cocatalyst is used instead of the MAO cocatalyst, again in an amount of 0.5 mmol/l.

The results are given in Table 6.

Examples 24 to 29 (Comparative Examples)

Example 23 was repeated, except that silica $SiO_2$ calcined according to the technique in Example 1(a) or a silica modified in a different way from that according to the present invention, namely by fluorination of $SiO_2$ or of $SiO_2$/dibutoxyaluminoxytriethoxysilane with $(NH_4)_2SiF_6$ in the case of Examples 25 and 27, respectively; by stopping at the $SiO_2$/dibutoxyaluminoxytriethoxysilane and $SiO_2$/dibutoxyaluminoxytriethoxysilane/$O_2$ stages, respectively, in the case of Examples 26 and 28, respectively; and by chlorination of $SiO_2$/dibutoxyaluminoxytriethoxysilane/$O_2$ using $NH_4Cl$ in the case of Example 29, was used as the activator solid support.

The operation methods in Examples 25, 27 and 29 may be summarized as follows:

Example 25

The silica of Example 1 which has undergone the initial heat treatment (silica containing 1 mmol of OH/g) is used.

140 mg of $(NH_4)_2SiF_6$ are added to 2 g of this silica and the mixture, which is gently fluidized by a stream of argon, is made to undergo the heat treatment indicated at the end of Example 1(a).

Example 27

The procedure is carried out as in Example 1(a) except that 62 mg of $(NH_4)_2SiF_6$ are added to the stock which is functionalized by dibutoxyaluminoxytriethoxysilane and dried for 1 hour at 100° C. in dynamic vacuum, and the mixture, which is gently fluidized by a stream of argon, is made to undergo the heat treatment indicated at the end of Example 1(a). The oxygen heat treatment in Example 1(a) is not carried out here.

Example 29

The procedure is carried out as in Example 1(a) except that $(NH_4)_2SiF_6$ is replaced by $NH_4Cl$.

The results are also given in Table 5.

TABLE 5

Polymerization of ethylene
Metallocene catalyst: $CpZrCl_2$ in an amount of 3 μmol/l
Cocatalyst: TiBA in an amount of 0.5 mmol/l
Amount of activator solid support

| Example | Activator solid support | Productivity (gPE/mol Zr) |
|---|---|---|
| 23 | $SiO_2$/dibutoxyaluminoxytriethoxysilane/$O_2$/F | $6.20 \times 10^5$ |
| 24 (comp.) | $SiO_2$ | 0 |
| 25 (comp.) | $SiO_2$/F | 0 |
| 26 (comp.) | $SiO_2$/dibutoxyaluminoxytriethoxysilane | 0 |
| 27 (comp.) | $SiO_2$/dibutoxyaluminoxytriethoxysilane/F | $9.76 \times 10^4$ |
| 28 (comp.) | $SiO_2$/dibutoxyaluminoxytriethoxysilane/$O_2$ | 0 |
| 29 (comp.) | $SiO_2$/dibutoxyaluminoxytriethoxysilane/$O_2$/Cl | 0 |

II—POLYMERIZATION OF PROPYLENE

Pressure: 4 bar

Temperature: 40° C.

Suspension medium: 500 cm³ of heptane.

Example 30

(a) Preparation of solid support ①

The procedure is carried out as in Example 1(a).

(b) Polymerization of propylene

The following are placed in a 1 liter round-bottomed flask: 500 cm³ of heptane, 0.16 cm³ of MAO (1.53 mol/l of aluminium in toluene), 17 mg of the solid support compound obtained at (a) and 1.5 μmol of $EtInd_2ZrCl_2$ ($5.56 \times 10^{-4}$ mol/l in toluene). This suspension is injected into the 1 l reactor. The polymerization temperature is 40° C. and the propylene pressure is 4 bar. After 74 minutes, 24 g of polypropylene with a melting point of 137.6° C. and a % mm of 89.6 are recovered.

The results are given in Table 6.

Example 31 (Comparative Example)

The procedure is carried out as in Example 30, except that no catalyst activator solid support is used.

The results are also given in Table 6.

Example 32

The procedure is carried out as in Example 30, except that the 1.5 μmol of $Et(Ind)_2ZrCl_2$ are replaced by 1.5 μmol of $Me_2Si(Ind)_2ZrCl_2$.

The results are also given in Table 6.

Example 33 (Comparative Example)

The procedure is carried out as in Example 32, except that no catalyst activator solid support is used.

The results are also given in Table 6.

and the TiBA is replaced by MAO used in an amount of 0.5 mmol/l, maintaining the proportions of aluminium.

14.6 g of copolymer are recovered after polymerizing for 30 minutes.

TABLE 6

Metallocene catalyst used in an amount of 3 μmol/l
Cocatalyst: MAO in an amount of 0.5 mmol/l

| Example | Metallocene catalyst | Activator solid support for the catalyst (mg) | Activity (gPP/ mol Zr · h) | Productivity (gPP/mol Zr) | Activity (gPP/ $g_{cat}$ · h) | Productivity (gPP/$g_{cat}$) | $\overline{M}_w$ | $\overline{M}_n$ | $\overline{M}_w/\overline{M}_n$ | $T_{melting}$ (° C.) | % mm |
|---|---|---|---|---|---|---|---|---|---|---|---|
| 30 | Et(Ind)$_2$ZrCl$_2$ | Solid support① (16) | 1.67 × 10$^7$ | 1.17 × 10$^7$ | 1582 | 1108 | 37890 | 16970 | 2.23 | 137.6 | 89.6 |
| 31 (comp.) | Et(Ind)$_2$ZrCl$_2$ | — | 1.04 × 10$^7$ | 0.81 × 10$^7$ | — | — | 38150 | 19270 | 1.98 | 135.8 | 89.8 |
| 32 | Me$_2$(Ind)$_2$ZrCl$_2$ | Solid support① (16) | 0.89 × 10$^7$ | 0.37 × 10$^7$ | 974 | 405 | 62830 | 27930 | 2.25 | 145.0 | 92.8 |
| 33 (comp.) | Me$_2$(Ind)$_2$ZrCl$_2$ | — | 0.44 × 10$^7$ | 0.34 × 10$^7$ | — | — | 61740 | 26670 | 2.31 | 144.3 | 90.9 |

III—ETHYLENE-HEXENE COPOLYMERIZATION

Example 34

The following are introduced in succession into a 1 liter round-bottomed flask: 300 cm$^3$ of heptane, 5 cm$^3$ of 1-hexane, 0.15 cm$^3$ of TiBA (1 mol/l in heptane), 18 mg of solid support ① and 1×10$^{-7}$ mol of Et(Ind)$_2$ZrCl$_2$. This suspension is introduced into a 500 cm$^3$ reactor put under an inert atmosphere. After the suspension has been introduced, ethylene is gradually introduced with the temperature rise, reaching 4 bar at 80° C.

After polymerizing for 30 minutes, 17.1 g of copolymer having 6.9% of hexene by weight (infrared analysis) and a melting point of 113° C. are recovered.

The results are given in Table 7.

Example 35 (Comparative Example)

The procedure is carried out as in Example 34, except that no activator solid support is used and the metallocene catalyst is used in an amount of 3 μmol/l and the TiBA is used in an amount of 1 mmol/l.

No polymer is recovered (cf. Table 7).

Example 36

The following are added in succession to a 1 liter round-bottomed flask: 300 cm$^3$ of heptane, 5 cm$^3$ of 1-hexene and 0.13 cm$^3$ of TiBA (1 mol/l in heptane).

22 mg of solid support ① and 0.2 cm$^3$ of TiBA are introduced into a 50 cm$^3$ round-bottomed flask and, after stirring for 5 minutes, 1.5×10$^{-7}$ mol of Et(Ind)$_2$ZrCl$_2$ dissolved in toluene are introduced.

The contents of the 50 cm$^3$ flask is introduced into the 500 cm$^3$ flask. This is all then introduced into the polymerization reactor. The experiment takes place at 80° C. with an ethylene pressure of 4 bar. After polymerizing for 30 minutes, 20.2 g of polymer are obtained.

The results are given in Table 7.

Example 37 (Comparative Example)

The procedure is carried out as in Example 35, except that the metallocene catalyst is used in an amount of 0.5 μmol/l The results are also given in Table 7.

TABLE 7

Copolymerization of ethylene and 1-hexene
Ethylene pressure = 4 bar
Temperature = 80° C.
Suspension medium = 300 cm$^3$ of heptane

| Example | μmol/l of Et(Ind)$_2$ZrCl$_2$ catalyst | Activator solid support for the catalyst (mg) | Cocatalyst (mmol/l) | Productivity after 30 minutes (gCOPO/ mol Zr) |
|---|---|---|---|---|
| 34 | 0.5 | Solid support① (18) | TiBA (0.5) | 1.71 × 10$^8$ |
| 35 (comp.) | 3 | — | TiBA (1) | 0 |
| 36 | 0.5 | Solid support① (22) | TiBA (0.5) | 1.34 × 10$^8$ |
| 37 (comp.) | 0.5 | — | MAO (0.5) | 9.73 × 10$^7$ |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above reference are hereby incorporated by reference.

What is claimed is:

1. Catalytic system for the polymerization of olefins, comprising:

(a) a metallocene catalyst, which has optionally been subjected to a prealkylation treatment;

(b) a cocatalyst; and (c) an activator solid support for metallocene, said support consisting of a group of support particles for a solid catalytic component, which are formed from at least one porous mineral oxide, the particles having been modified to carry, on the surface, aluminum and/or magnesium Lewis-acid sites of formula:

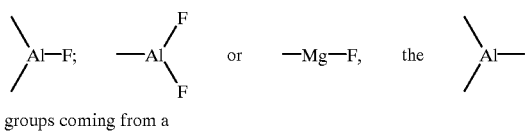

groups coming from a functionalization agent having reacted with —OH radicals carried by the base particles of the support, the functionalization reaction having been followed by a fluorination reaction, optionally the cocatalyst (b) being absent if the metallocene catalyst (a) has been prealkylated, optionally the support (c) having been impregnated with the metallocene catalyst (a), which catalyst has optionally been subjected to a prealkylation treatment carried out either before or after the support has been pre-impregnated.

2. Catalytic system according to claim 1, wherein the mineral oxides are selected from silica, alumina and mixtures thereof.

3. Catalytic system according to claim 1, wherein the particles include pores having a diameter ranging from 7.5 to 30 nm.

4. Catalytic system according to claim 1, wherein the particles have a porosity ranging from 1 to 4 cm$^3$/g.

5. Catalytic system according to claim 1, wherein the particles have a specific surface area ranging from 100 to 600 m$^2$/g.

6. Catalytic system according to claim 1, wherein the particles have an average diameter ranging from 1 to 100 μm.

7. Catalytic system according to claim 1, wherein the particles have, on their surface, from 0.25 to 10 of the said at least partially fluorinated aluminum and/or magnesium Lewis-acid sites per nm$^2$.

8. Catalytic system according to claim 7, wherein the surface area has from 0.5 to 4 of the said at least partially fluorinated aluminum and/or magnesium Lewis-acid sites per nm$^2$.

9. Catalytic system according to claim 1, wherein the at least partially fluorinated aluminum and/or magnesium Lewis-acid sites are formed by the reaction of —OH radicals carried by the support base particles with at least one functionalization agent selected from:

compounds of formula (I):

in which the R$^1$ groups, which are identical or different, each represent a C$_1$–C$_{20}$ alkyl group;

compounds of formula (II):

in which the R$^2$ groups, which are identical or different, each represent a C$_1$–C$_{20}$ alkyl group; and compounds of formula (III):

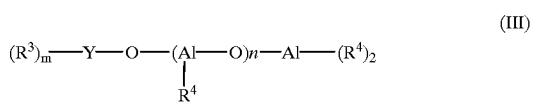

in which:

the R$^3$ groups, which are identical or different, each represent a C$_1$–C$_{12}$ alkyl group or a C$_1$–C$_{12}$ alkoxy group;

the R$^4$ groups, which are identical or different, each represent a C$_1$–C$_{12}$ alkyl group or a C$_1$–C$_{12}$ alkoxy group;

Y represents Al or Si, m having a value of 2 if Y=Al and 3 if Y=Si; and n has a value of 0 or is an integer from 1 to 40;

compounds of formula (IV):

in which:

the R$^5$ groups each represent a C$_1$–C$_8$ alkyl group; and

P is an integer from 3 to 20,

The said functionalization reaction having been followed by a fluorination reaction.

10. Catalytic system according to claim 9, wherein n has a value of 0 or is an integer from 1 to 20.

11. Catalytic system according to claim 9, wherein compound (I) is triethylaluminum.

12. Catalytic system according to claim 9, wherein compound (II) is (n-butyl) (sec-butyl) magnesium.

13. Catalytic system according to claim 9, wherein compound (III) is dibutoxyaluminoxytriethoxysilane (C$_2$H$_5$O)$_3$Si-O-Al-(OC$_4$H$_9$)$_2$, tetraisobutyldialuminoxane (iBu)$_2$Al-O-al(iBu)$_2$ and linear alkylaluminoxane oligomers.

14. Catalytic system according to claim 9, wherein compound (III) is a linear alkylaluminoxane oligomer in which R$^3$ and R$^4$ are methyl groups.

15. Catalytic system according to claim 1, wherein the support is pre-impregnated with a metallocene catalyst, the metallocene catalyst having been subjected optionally to a prealkylation treatment carried out before or after the support has been pre-impregnated.

16. Catalytic system for the polymerization of olefins, comprising:

(a) a metallocene catalyst, which has optionally been subjected to a prealkylation treatment;

(b) a cocatalyst; and (c) an activator solid support for metallocene, said support having been prepared by a process wherein a group of support particles for a solid catalytic component, which are formed from at least one porous mineral oxide and carry, on the surface, —OH radicals, has undergone functionalization by using a functionalization agent capable of grafting aluminum and/or magnesium Lewis-acid sites on the particles; the support particles thus grafted having then being subjected to a fluorination treatment, optionally the cocatalyst (b) being absent if the metallocene catalyst (a) has been prealkylated, optionally the support (c) having been impregnated with the metallocene catalyst (a), which catalyst has optionally been subjected to a prealkylation treatment carried out either before or after the support has been pre-impregnated.

17. Catalytic system according to claim 16, wherein the mineral oxides have been selected from silica, alumina, and mixtures thereof.

18. Catalytic system according to claim 16, wherein particles which include pores having a diameter ranging from 7.5 to 30 nm have been used.

19. Catalytic system according to claim 16, wherein particles having a porosity ranging from 1 to 4 cm$^3$/g have been used.

20. Catalytic system according to claim 16, wherein particles having a specific surface area ranging from 100 to 600 m²/g have been used.

21. Catalytic system according to claim 16, wherein particles having an average diameter ranging from 1 to 100 μm have been used.

22. Catalytic system according to claim 16, wherein particles having, on their surface, ranging from 0.25 to 10 of the —OH radicals per nm² have been used.

23. Catalytic system according to claim 22, wherein the surface has from 0.5 to 4 of —OH radicals per nm².

24. Catalytic system according to claim 16, wherein a functionalization agent selected from:
compounds of formula (I):

$$Al\ (R^2)_3 \qquad (I)$$

in which the R¹ groups, which are identical or different, each represent a $C_1$–$C_{20}$ alkyl group;
compounds of formula (II):

$$Mg\ (R^2)_2 \qquad (II)$$

in which the R² groups, which are identical or different, each represent a $C_1$–$C_{20}$ alkyl group; and
compounds of formula (III):

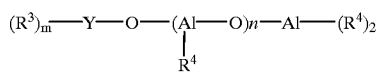

in which:
the R³ groups, which are identical or different, each represent a $C_1$–$C_{12}$ alkyl group or a $C_1$–$C_{12}$ alkoxy group;
the R⁴ groups, which are identical or different, each represent a $C_1$–$C_{12}$ alkyl group or a $C_1$–$C_{12}$ alkoxy group;
Y represents Al or Si, m having a value of 2 if Y=Al and 3 if Y=Si; and
n has a value of 0 or is an integer from 1 to 40;
compounds of formula (IV):

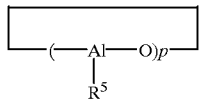

in which:
the R⁵ groups each represent a $C_1$–$C_8$ alkyl group; and
P is an integer from 3 to 20,
The said functionalization reaction having been followed by a fluorination reaction.

25. Catalytic system according to claim 16, wherein the functionalization has been carried out by treating a suspension of the particles in a solvent medium with the functionalization agent at a temperature ranging from −100 to +150° C. for a period of time ranging from 1 minute to 12 hours, and then by recovering the grafted particles after washing.

26. Catalytic system according to claim 16, wherein from 0.5 to 20 mmol of functionalization agent per g of particles have been used.

27. Catalytic system according to claim 16, wherein, after the functionalization, a heat treatment in an inert gas has been carried out, the treatment being intended to remove the alkoxy groups present on the surface.

28. Catalytic system according to claim 27, wherein the heat treatment is in a fluidized bed of inert gas.

29. Catalytic system according to claim 16, wherein, prior to the fluorination treatment, an oxidation treatment has been carried out which consists of a heat treatment in a bed fluidized by oxygen.

30. Catalytic system according to claim 16, wherein the fluorination treatment has been carried out by bringing the functionalized support particles into contact with gaseous hydrofluoric acid, optionally after heat treatment in an inert gas and/or after oxidation, in an amount of from 1 to 5% by weight of fluorine for the said support particles, this contacting step having been carried out for a period of time ranging from 1 minute to 24 hours, at a temperature ranging from 20 to 800° C.

31. Catalytic system according to claim 30, wherein the amount is 3 to 5%.

32. Catalytic system according to claim 16, wherein the fluorination treatment has been carried out by $(NH_4)_2SiF_6$, by mixing the functionalized support particles, optionally after heat treatment in an inert gas and/or after oxidation, with powdered $(NH_4)_2SiF_6$, in an amount ranging from 1 to 5% by weight of fluorine for the support particles, and then by gently fluidizing the aforementioned mixture with an inert gas and by carrying out a heat treatment at a temperature of approximately 300 to 500° C. for approximately 1 to 10 hours.

33. Catalytic system according to claim 32, wherein the amount is 3 to 5%.

34. Catalytic system according to claim 1, wherein the metallocene catalyst (a) is selected from compound of formula (V):

$$ML_x \qquad (V)$$

in which:
M represents a transition metal belonging to Group 4b of the Periodic Table of Elements;
L represents a ligand coordinated to the transition metal, at least one ligand L being a group having a cycloalkadienyl backbone; and
x is equal to the valency of the transition metal, the ligands L, the number of which is equal to the valency of the transition metal M, being identical or different;
when compound (V) contains at least two groups having a cycloalkadienyl backbone, optionally at least two of these groups to be linked together by a divalent radical;
when a group having a cycloalkadienyl backbone is substituted, the substituents selected from $C_1$–$C_{20}$ alkyl, $C_2$–$C_{20}$ alkenyl, aryl and aralkyl groups, optionally two substituents lying in adjacent positions on the same cyclopentadienyl ring to be linked together, forming an aromatic or non-aromatic ring condensed on the said cycloalkadienyl ring, and, if the latter is a cyclopentadienyl ring, the resulting condensed ring is an indenyl, tetrahydroindenyl, fluorenyl or octahydrofluorenyl ring;
optionally at least one ligand L to be selected from a divalent group consisting of formula —O—; —S—; —NR⁶—; and —PR⁶— where R⁶ represents hydrogen or a group selected from silyl, alkyl or aryl groups, the latter two optionally being halogenated; one of the free valencies of which is linked to the transition metal M atom and the other free valency of which is linked to a divalent radical which is itself linked to a ligand L having a cycloalkadienyl backbone; and groups of formula —OR⁷; —SR⁷; —NR⁷₂; or —PR⁷₂, the free valency of which is linked to a divalent radical which is itself linked to a ligand L having a cycloalkadienyl backbone;

optionally ligands L differing from those defined above to be selected from hydrocarbon groups containing from 1 to 20 carbon atoms, alkoxy groups and halogens.

35. Catalytic system according to claim 1, wherein the cocatalyst (b) is selected from:
(bi) alkylaluminums of formula (Ia):

in which the $R^8$ groups, which are identical or different, represent a substituted or unsubstituted alkyl, containing from 1 to 12 carbon atoms; an alkoxy; aryl; a halogen; hydrogen or oxygen; at least one $R^8$ group representing an alkyl;

(b2) aluminum sesquihalides;
(b3) compounds of formula (IIIa)

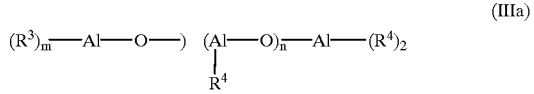

in which:
the $R^3$ groups, which are identical or different, each represent a $C_1$–$C_{12}$ alkyl group or a $C_1$–$C_{12}$ alkoxy group;
the $R^4$ groups, which are identical or different, each represent a $C_1$–$C_{12}$ alkyl group or a $C_1$–$C_{12}$ alkoxy group;
m has a value of 2; and
n has a value of 0 or is an integer from 1 to 40, and (b4) compounds of formula (IV)

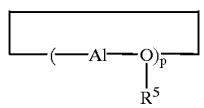

in which:
the $R^5$ groups each represent a $C_1$–$C_8$ alkyl group; and
p is an integer from 3 to 20,
the said functionalization reaction having been followed by a fluorination reaction.

36. Catalytic system according to claim 35, wherein the cocatalyst (b) is selected from methylaluminoxane, triisobutylaluminum and triethylaluminum.

37. Catalytic system according to claim 35, wherein the molar ratio of Al of the cocatalysts (b1) or (b2) to the transition metal of the metallocene is from 1 to 10,000; and the molar ratio of Al of the cocatalyst (b3) or (b4) to the transition metal of the metallocene (a) is from 1 to 10,000.

38. Catalytic system according to claim 37, wherein the molar ratio is from 1 to 2000 for the metallocene and from 10 to 200 for the transition metal.

39. Catalytic system according to claim 1, wherein the activator solid is used in an amount ranging from 0.01 to 2000 mg, per µmole of metallocene catalyst.

40. Catalytic system according to claim 39, wherein the amount is from 0.01 to 200 mg.

41. Catalytic system according to claim 16, wherein the metallocene catalyst (a) is selected from compound of formula (V):

$$ML_x \qquad (V)$$

in which:
M represents a transition metal belonging to Group 4b of the Periodic Table of Elements;

L represents a ligand coordinated to the transition metal, at least one ligand L being a group having a cycloalkadienyl backbone; and x is equal to the valency of the transition metal, the ligands L, the number of which is equal to the valency of the transition metal M, being identical or different;

when compound (V) contains at least two groups having a cycloalkadienyl backbone, optionally at least two of these groups to be linked together by a divalent radical;

when a group having a cycloalkadienyl backbone is substituted, the substituents selected from $C_1$–$C_{20}$ alkyl, $C_1$–$C_{20}$ alkenyl, aryl and aralkyl groups, optionally two substituents lying in adjacent positions on the same cyclopentadienyl ring to be linked together, forming an aromatic or non-aromatic ring condensed on the said cyclopentadienyl ring, and, if the latter is a cyclopentadienyl ring, the resulting condensed ring is an indenyl, tetrahydroindenyl, fluorenyl or octahydrofluorenyl ring;

optionally at least one ligand L to be selected from the group consisting of formula —O—; —S—; $NR^6$—; and —$PR^6$— where $R^6$ represents hydrogen or a group selected from silyl, alkyl or aryl groups, the latter two optionally being halogenated, one of the free valencies of which is linked to the transition metal M atom and the other free valency of which is linked to a divalent radical which is itself linked to a ligand L having a cycloalkadienyl backbone; and groups of formula —$OR^7$; —$SR^7$; —$NR^7_2$; or —$PR^7_2$, $R^7$ having the same meaning as $R^6$ above, the free valency of which is linked to a divalent radical which is itself linked to a ligand L having a cycloalkadienyl backbone;

optionally ligands L differing from those defined above to be selected from hydrocarbon groups containing from 1 to 20 carbon atoms, alkoxy groups and halogens.

42. Catalytic system according to claim 16, wherein the catalyst (b) is selected from:
(b1) alkylaluminums of formula (Ia):

in which the $R^8$ groups, which are identical or different, represent a substituted or unsubstituted alkyl; containing from 1 to 12 carbon atoms; an alkoxy; an aryl; a halogen; hydrogen or oxygen; at least one $R^8$ group representing an alkyl;

(b2) aluminum sesquihalides;
(b3) compounds of formula (IIIa)

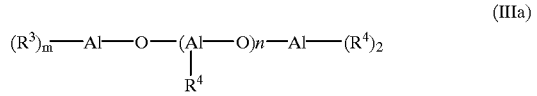

the $R^3$ groups, which are identical or different, each represent a $C_1$–$C_{12}$ alkyl group or a $C_1$–$C_{12}$ alkoxy group;
the $R^4$ groups, which are identical or different, each represent a $C_1$–$C_{12}$ alkyl group or a $C_1$–$C_{12}$ alkoxy group, m having a value of 2; and
n has a value of 0 or is an integer from 1 to 40;

(b4) compounds of formula (IV):

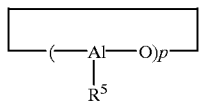
(IV)

in which the $R^5$ groups each represent a $C_1$–$C_8$ alkyl group; and

P is an integer from 3 to 20, the said functionalization reaction having been followed by a fluorination reaction.

43. Catalytic system according to claim 42, wherein the molar ratio of Al of the cocatalysts (b1) or (b2) to the transition metal of the metallocene is from 1 to 10,000; and the molar ratio of Al of the cocatalyst (b3) or (b4) to the transition metal of the metallocene (a) is from 1 to 10,000.

44. Catalytic system according to claim 43, wherein the molar ratio is from 7 to 2000 for the metallocene and from 70 to 200 for the transition metal.

45. Catalytic system according to claim 16, wherein the activator solid is used in an amount ranging from 0.01 to 2000 mg, per µmole of metallocene catalyst.

46. Catalytic system according to claim 45, wherein the amount is from 0.07 to 200 mg.

* * * * *